US012654109B2

(12) United States Patent (10) Patent No.: US 12,654,109 B2
Zhu et al. (45) Date of Patent: Jun. 16, 2026

(54) APPLE WATCH-BASED HTML5 SOMATOSENSORY GAME METHOD

(71) Applicant: Shenzhen Shimi Network Technology Co., Ltd., Shenzhen (CN)

(72) Inventors: Wei Zhu, Shenzhen (CN); Jun Li, Shenzhen (CN)

(73) Assignee: Shenzhen Shimi Network Technology Co., Ltd., Shenzhen (CN)

( * ) Notice: Subject to any disclaimer, the term of this patent is extended or adjusted under 35 U.S.C. 154(b) by 429 days.

(21) Appl. No.: 18/244,231

(22) Filed: Sep. 9, 2023

(65) Prior Publication Data

US 2025/0018305 A1 Jan. 16, 2025

(30) Foreign Application Priority Data

Jul. 13, 2023 (CN) .......................... 202310865854.5

(51) Int. Cl.
  *A63F 13/77* (2014.01)
  *A63F 13/212* (2014.01)
  *A63F 13/335* (2014.01)
(52) U.S. Cl.
  CPC ............ *A63F 13/77* (2014.09); *A63F 13/212* (2014.09); *A63F 13/335* (2014.09)
(58) Field of Classification Search
  CPC ....... A63F 13/335; A63F 13/212; A63F 13/77
  USPC .......................................................... 463/42
  See application file for complete search history.

(56) References Cited

U.S. PATENT DOCUMENTS

| 2021/0074005 | A1* | 3/2021 | Xie | ............................ | G06T 7/73 |
| 2023/0259697 | A1* | 8/2023 | Fan | .......................... | G06F 9/451 |
| | | | | | 715/256 |
| 2023/0343318 | A1* | 10/2023 | Wang | ..................... | G06F 1/1688 |
| 2024/0045639 | A1* | 2/2024 | Yang | ..................... | G06F 3/1454 |
| 2024/0069937 | A1* | 2/2024 | Zhang | ..................... | G06F 9/451 |
| 2025/0018293 | A1* | 1/2025 | Cao | ..................... | A63F 13/5372 |

FOREIGN PATENT DOCUMENTS

| CN | 1826765 | A | * | 8/2006 | |
| CN | 108371815 | A | * | 8/2018 | ............. A63F 13/55 |
| CN | 110572866 | A | * | 12/2019 | .......... H04W 52/028 |
| CN | 112860428 | A | * | 5/2021 | ........... G06F 9/5044 |
| CN | 115904059 | A | * | 4/2023 | ............. G10L 15/22 |
| CN | 120831132 | A | * | 10/2025 | |

* cited by examiner

*Primary Examiner* — Michael A Cuff
(74) *Attorney, Agent, or Firm* — IPro, PLLC

(57) ABSTRACT

A somatosensory game method and device, and a computer-readable storage medium are disclosed. The method includes: when a somatosensory game program is started, caching a game resource package from a server to a local device; after a somatosensory game is started, obtaining somatosensory data from a smart watch; generating a corresponding game instruction according to the somatosensory data; sending the game instruction to the somatosensory game program on the local device in real time; and synchronizing a game state of the somatosensory game to the server based on a preset synchronization mechanism.

10 Claims, 2 Drawing Sheets

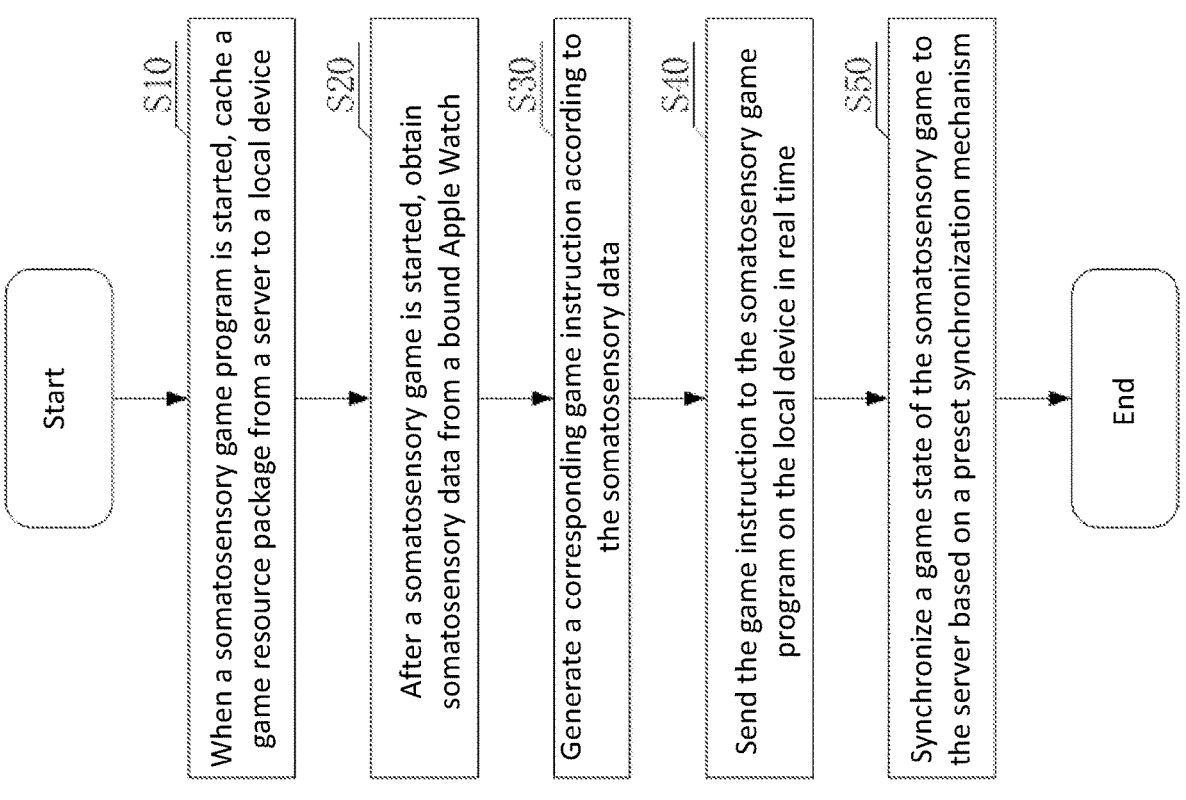

Start

S10
When a somatosensory game program is started, cache a game resource package from a server to a local device S20
After a somatosensory game is started, obtain somatosensory data from a bound Apple Watch S30
Generate a corresponding game instruction according to the somatosensory data S40
Send the game instruction to the somatosensory game program on the local device in real time S50
Synchronize a game state of the somatosensory game to the server based on a preset synchronization mechanism End

Fig. 2

APPLE WATCH-BASED HTML5 SOMATOSENSORY GAME METHOD

TECHNICAL FIELD

The present invention relates to the technical field of somatosensory games, and in particular to a smart watch-based somatosensory game method and device, and a computer-readable storage medium.

BACKGROUND

At present, in webpage-based somatosensory games, the progress of the games depends on local devices to obtain somatosensory data of somatosensory devices, and the somatosensory data is uploaded to a server through the local devices. This solution not only relies heavily on networks, but also requires specific peripherals such as gamepads as input devices for game instructions. Therefore, there are high restrictions, and the actual game experience of players is not good.

SUMMARY

Embodiments of the present application provide a smart watch-based HTML5 somatosensory game method, which is intended to reduce the dependence of web somatosensory games on network delays and devices, and improve the game experience of players.

In order to achieve the above objective, the embodiments of the present application provide a smart watch-based HTML5 somatosensory game method, comprising:

when a somatosensory game program is started, caching a game resource package from a server to a local device;

after a somatosensory game is started, obtaining somatosensory data from a smart watch;

generating a corresponding game instruction according to the somatosensory data;

sending the game instruction to the somatosensory game program on the local device in real time; and synchronizing a game state of the somatosensory game to the server based on a preset synchronization mechanism.

In an embodiment, before synchronizing the game state of the somatosensory game to the server based on the preset synchronization mechanism, the method further comprises:

determining the preset synchronization mechanism according to an online attribute of the somatosensory game.

In an embodiment, if the online attribute of the somatosensory game is a single-player mode, synchronizing the game state of the somatosensory game to the server based on the preset synchronization mechanism comprises:

building a game state cache library;

recording game state information comprising a time stamp at set intervals, and caching the game state information to the game state cache library;

when a capacity of the game instruction state cache library satisfies a specified capacity condition, packaging and uploading all game state information in the game state cache library to the server; and when the somatosensory game ends, packaging and uploading the remaining game state information in the game instruction cache library to the server.

In an embodiment, building the game state cache library comprises:

obtaining hardware information of the local device;

obtaining real-time memory operating status of the local device;

evaluating a current cache performance index of the local device according to the hardware information and the real-time memory operating status; and building and dynamically adjusting the game state cache library according to the current cache performance index.

In an embodiment, the hardware information comprises processor model, memory capacity, and storage space;

the real-time memory operating status comprises current memory usage, remaining memory capacity, and memory access speed; and evaluating the current cache performance index of the local device according to the hardware device information and the real-time memory operating status comprises:

calculating a weighted mean of processor frequency, memory capacity, storage space, memory usage, memory remainder, and memory access speed as the current cache performance index.

In an embodiment, building and dynamically adjusting the game state cache library according to the current cache performance index comprises:

if the cache performance index is higher than a preset high threshold, then increasing the capacity, recording frequency, and uploading frequency of the game state cache library;

if the cache performance index is lower than a preset low threshold, then reducing the capacity, recording frequency, and uploading frequency of the game state cache library; and if the cache performance index is between the preset high threshold and the low threshold, then maintaining the capacity, recording frequency, and uploading frequency of the game state cache library.

In an embodiment, if the online attribute of the somatosensory game is an online mode, synchronizing the game state of the somatosensory game to the server based on the preset synchronization mechanism comprises:

at the beginning of each game frame, obtaining the latest game state from the server, and comparing the latest game state with the game state of the local device;

if the game state of the local device is inconsistent with the game state of the server, making an adjustment according to a preset conflict resolution strategy;

at the end of each game frame, uploading the game state of the local device to the server, and broadcasting player information of the local device to other players; and within each fixed time interval, obtaining other player information from the server, and updating the game state of the local device.

In an embodiment, caching the game resource package from the server to the local device comprises:

detecting whether the somatosensory game is enabled on the local device for the first time;

if so, caching the game resource package from the server to the local device; and if not, comparing a somatosensory game version of the local device with a somatosensory game version on the server, and when the somatosensory game version of the local device is inconsistent with the somatosensory game version of the server, caching the game resource package from the server to the local device.

In order to achieve the above objective, the embodiments of the present application further propose a smart watch-based HTML5 somatosensory game device, comprising a memory, a processor and a smart watch-based HTML5 somatosensory game program stored on the memory and executable on the processor, wherein when the processor executes the smart watch-based HTML5 somatosensory game program, any one of the smart watch-based HTML5 somatosensory game methods as described above is implemented.

In order to achieve the above objective, the embodiments of the present application further propose a computer-readable storage medium, having a smart watch-based HTML5 somatosensory game program stored thereon, wherein when the smart watch-based HTML5 somatosensory game program is executed by a processor, any one of the smart watch-based HTML5 somatosensory game methods as described above is implemented.

The somatosensory game method of the present application can run the somatosensory game on the local device, and can also synchronize the game state of the somatosensory game to the server, so that the player's input and somatosensory actions are directly processed on the local device, and the game instructions are sent to the local game program in real time without waiting for the server's response, which can provide faster response speed and smoother game experience. Moreover, running the game on the local device reduces the dependence on a stable network connection. Even when the network is unstable or the connection is interrupted, the player can still continue the game, and the game state will be synchronized to the server after the network is restored. Besides, since most of the game running and processing work is done on the local device, the server only needs to handle game state synchronization and some core logic, which reduces the pressure on the server and improves the performance and response speed of the server. Additionally, by running the game locally, game data and player personal information can be better protected. Compared with storing all game data on the server, running the game locally can reduce the transmission and storage of the player's personal data, improving the player's privacy and data security.

Therefore, compared with the traditional somatosensory game method, the somatosensory game method of the present application can provide better performance, lower delay, offline support and higher data security, while reducing the dependence on the network and providing better player experience.

BRIEF DESCRIPTION OF FIGURES

In order to more clearly illustrate the technical solutions in embodiments of the present invention or the prior art, the drawings needed to be used in the description of the embodiments or the prior art will be briefly described below. Obviously, the drawings in the following description are only some embodiments of the present invention, and other drawings can also be obtained by those of ordinary skill in the art from the structures illustrated in these drawings without any creative efforts.

FIG. 2 is a schematic flowchart of a smart watch-based HTML5 somatosensory game method according to an embodiment of the present invention.

Figure 1:
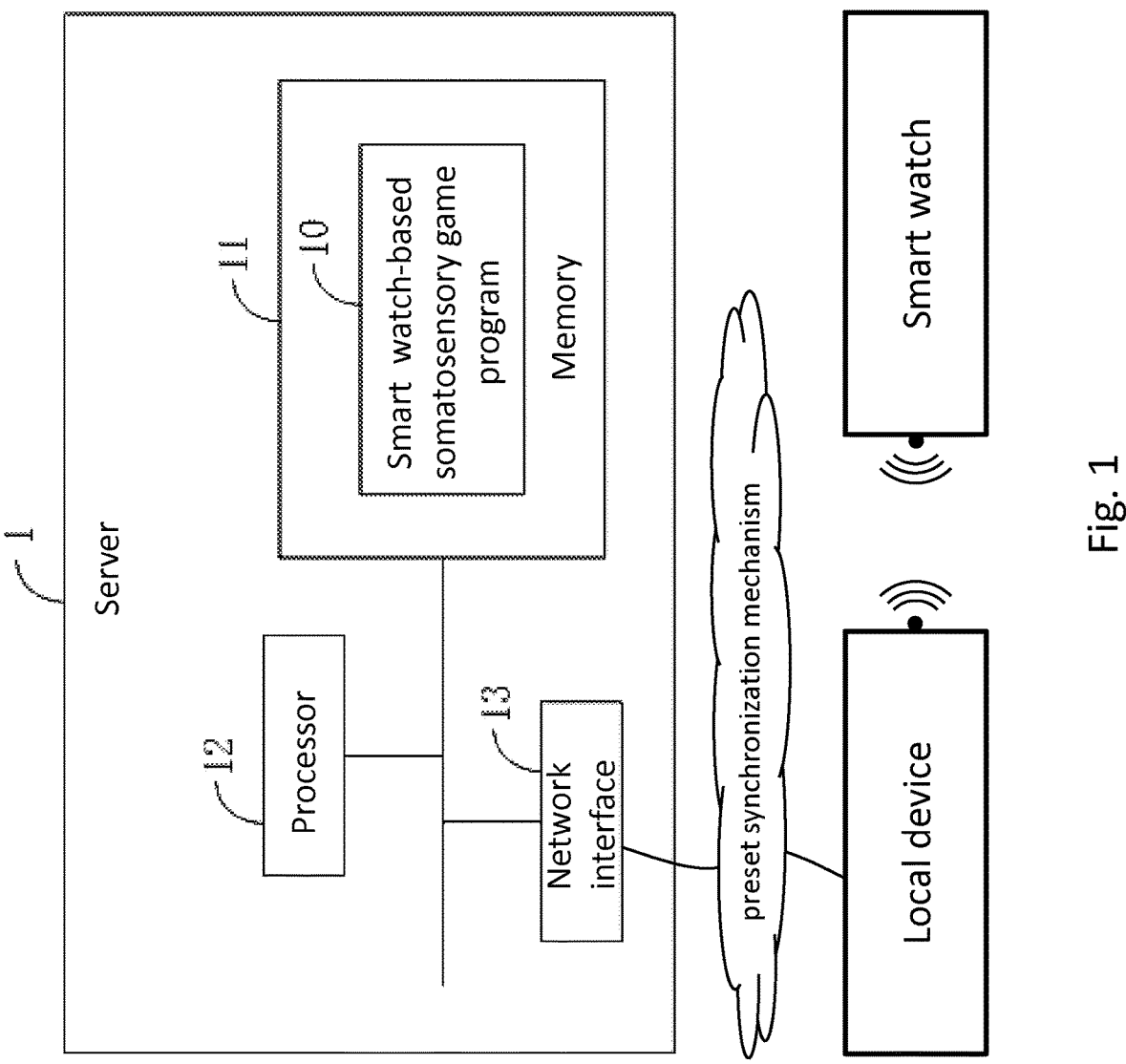
FIG. 1 is a module structural diagram of a smart watch-based HTML5 somatosensory game device according to an embodiment of the present invention.

The implementation, functional features and advantages of the objective of the present invention will be further described with reference to the drawings.

DETAILED DESCRIPTION

It should be understood that specific embodiments described herein are only used to explain the present invention and are not used to limit the present invention.

In order to better understand the above technical solutions, exemplary embodiments of the present disclosure will be described in more detail below with reference to the drawings. While the exemplary embodiments of the present disclosure have been shown in the drawings, it should be understood that the present disclosure may be implemented in various forms and should not be limited by the embodiments set forth herein. Rather, these embodiments are provided so that the present disclosure can be understood more thoroughly, and the scope of the present disclosure can be fully conveyed to those skilled in the art.

It should be noted that, in the claims, any reference signs placed between parentheses shall not be construed as limiting the claims. The words "comprising" or "comprises" herein do not exclude the presence of components or steps not listed in the claims. The indefinite article "a" or "an" preceding a component does not exclude the presence of a plurality of such components. The present invention can be implemented by means of hardware including several different components, and a suitably programmed computer. In a unit claim enumerating several means, several of these means can be embodied by the same item of hardware. Moreover, the use of "first," "second," and "third," etc. does not imply any order, and these words may be construed as designations.

As shown in FIG. 1, FIG. 1 is a schematic structural diagram of a server 1 (also called a smart watch-based HTML5 somatosensory game device) in a hardware running environment involved in a solution of an embodiment of the present invention.

The server of the embodiment of the present invention is, for example, an "Internet of Things device", a smart air conditioner with a networking function, a smart light, a smart power supply, an AR/VR device with a networking function, a smart speaker, a self-driving car, a PC, a smart phone, a tablet computer, an e-book reader, a portable computer, or other devices with display functions.

As shown in FIG. 1, the server 1 includes a memory 11, a processor 12 and a network interface 13.

The memory 11 includes at least one type of readable storage medium, and the readable storage medium includes a flash memory, a hard disk, a multimedia card, a card-type memory (e.g., an SD or DX memory, etc.), a magnetic memory, a magnetic disk, an optical disk or the like. In some embodiments, the memory 11 may be an internal storage unit of the server 1, such as a hard disk of the server 1. In other embodiments, the memory 11 may also be an external storage device of the server 1, such as a plug-in hard disk equipped on the server 1, a smart media card (SMC), a secure digital (SD) card, a flash card or the like.

Further, the memory 11 may also include an internal storage unit of the server 1 and an external storage device. The memory 11 can not only be used to store application software and various data installed on the server 1, such as codes of a smart watch-based HTML5 somatosensory game program 10, etc., but also can be used to temporarily store data that has been output or will be output.

In some embodiments, the processor 12 may be a central processing unit (CPU), a controller, a microcontroller, a microprocessor or other data processing chips, and used to run program codes or processing data stored in the memory 11, such as the smart watch-based HTML5 somatosensory game program 10, etc.

The network interface 13 may optionally include a standard wired interface and a wireless interface (such as a WI-FI interface), and is generally used to establish communication connections between the server 1 and other electronic devices.

The network may be the Internet, a cloud network, a wireless fidelity (Wi-Fi) network, a personal network (PAN), a local area network (LAN) and/or a metropolitan area network (MAN). Various devices in a network environment may be configured to connect to a communication network according to various wired and wireless communication protocols. Examples of such wired and wireless communication protocols may include, but are not limited to, at least one of the following: Transmission Control Protocol and Internet Protocol (TCP/IP), User (Player) Datagram Protocol (UDP), Hypertext Transfer Protocol (HTTP), file transfer Protocol (FTP), ZigBee, EDGE, IEEE 802.11, Optical Fidelity (Li-Fi), 802.16, IEEE 802.11s, IEEE 802.11g, multi-hop communication, wireless access point (AP), device-to-device communication, cellular communication protocol and/or Bluetooth (Blue Tooth) communication protocol, or a combination thereof.

Optionally, the server may further include a player interface. The player interface may include a display and an input unit such as a keyboard. Optional player interfaces may also include standard wired interfaces and wireless interfaces. Optionally, in some embodiments, the display may be an LED display, a liquid crystal display, a touch-sensitive liquid crystal display, an organic light-emitting diode (OLED) touch device, or the like. The display may also be referred to as a display screen or a display unit, and is used to display information processed in the server 1 and to display a visualized player interface.

FIG. 1 only shows the server 1 with components 11-13 and the smart watch-based HTML5 somatosensory game program 10. It can be understood by those skilled in the art that the structure shown in FIG. 1 does not form a limitation of the server 1, and may include fewer or more components than shown, or combinations of certain components, or different arrangements of components.

In this embodiment, the processor 12 may be used to call the smart watch-based HTML5 somatosensory game program stored in the memory 11, and perform the following operations:

when a somatosensory game program is started, caching a game resource package from a server to a local device;

after a somatosensory game is started, obtaining somatosensory data from a smart watch;

generating a corresponding game instruction according to the somatosensory data;

sending the game instruction to the somatosensory game program on the local device in real time; and synchronizing a game state of the somatosensory game to the server based on a preset synchronization mechanism.

In an embodiment, the processor 12 may be used to call the smart watch-based HTML5 somatosensory game program stored in the memory 11, and perform the following operations:

determining the preset synchronization mechanism according to an online attribute of the somatosensory game.

In an embodiment, the processor 12 may be used to call the smart watch-based HTML5 somatosensory game program stored in the memory 11, and perform the following operations:

building a game state cache library;

recording game state information comprising a time stamp at set intervals, and caching the game state information to the game state cache library;

when a capacity of the game instruction state cache library satisfies a specified capacity condition, packaging and uploading all game state information in the game state cache library to the server; and when the somatosensory game ends, packaging and uploading the remaining game state information in the game instruction cache library to the server.

In an embodiment, the processor 12 may be used to call the smart watch-based HTML5 somatosensory game program stored in the memory 11, and perform the following operations:

obtaining hardware information of the local device;

obtaining real-time memory operating status of the local device;

evaluating a current cache performance index of the local device according to the hardware information and the real-time memory operating status; and building and dynamically adjusting the game state cache library according to the current cache performance index.

In an embodiment, the processor 12 may be used to call the smart watch-based HTML5 somatosensory game program stored in the memory 11, and perform the following operations:

calculating a weighted mean of processor frequency, memory capacity, storage space, memory usage, memory remainder, and memory access speed as the current cache performance index.

In an embodiment, the processor 12 may be used to call the smart watch-based HTML5 somatosensory game program stored in the memory 11, and perform the following operations:

if the cache performance index is higher than a preset high threshold, then increasing the capacity, recording frequency, and uploading frequency of the game state cache library;

if the cache performance index is lower than a preset low threshold, then reducing the capacity, recording frequency, and uploading frequency of the game state cache library; and if the cache performance index is between the preset high threshold and the low threshold, then maintaining the capacity, recording frequency, and uploading frequency of the game state cache library.

In an embodiment, the processor 12 may be used to call the smart watch-based HTML5 somatosensory game program stored in the memory 11, and perform the following operations:

at the beginning of each game frame, obtaining the latest game state from the server, and comparing the latest game state with the game state of the local device;

if the game state of the local device is inconsistent with the game state of the server, making an adjustment according to a preset conflict resolution strategy;

at the end of each game frame, uploading the game state of the local device to the server, and broadcasting player information of the local device to other players; and within each fixed time interval, obtaining other player information from the server, and updating the game state of the local device.

In an embodiment, the processor 12 may be used to call the smart watch-based HTML5 somatosensory game program stored in the memory 11, and perform the following operations:

detecting whether the somatosensory game is enabled on the local device for the first time;

if so, caching the game resource package from the server to the local device; and if not, comparing a somatosensory game version of the local device with a somatosensory game version on the server, and when the somatosensory game version of the local device is inconsistent with the somatosensory game version of the server, caching the game resource package from the server to the local device.

Based on the hardware architecture of the smart watch-based HTML5 somatosensory game device described above, an embodiment of a smart watch-based HTML5 somatosensory game method is proposed. The smart watch-based HTML5 somatosensory game method of the present invention is intended to reduce the dependence of web somatosensory games on network delays and devices, and improve the game experience of players.

Referring to FIG. 2, FIG. 2 shows a smart watch-based HTML5 somatosensory game method according to an embodiment of the present invention. The smart watch-based HTML5 somatosensory game method includes the following steps:

S10: When a somatosensory game program is started, cache a game resource package from a server to a local device.

HTML5 refers to Hypertext Markup Language 5. The local device is a smart device that can be a smart watch.

Further, a player may start the game program by clicking an icon of a game application or by other means. Since it is a somatosensory game implemented based on HTML5, in addition to web pages, the somatosensory game may also be presented in the form of an applet.

After starting the somatosensory game, the local device may establish a communication connection with a preset server, and access the server through a network connection. The local device may send a request to the server to obtain a resource package required by the game, including game graphics, sound effects, game levels, etc.

After receiving the request from the local device, the server retrieves and packages the required game resources according to the content of the request. Then, the server transmits the game resource package to the local device, so that the game will be played locally later.

After receiving the game resource package transmitted by the server, the local device stores it in a local storage medium (such as a hard disk or a flash memory), so that it will be quickly accessed and loaded in the subsequent game process. It can be understood that by caching the game resource package, frequent requests to the server can be reduced, and the speed and performance of loading the game can be improved.

Once the game resource package is successfully obtained from the server and cached in the local device, the somatosensory game program can prepare a game environment.

This includes initializing the game's settings, loading the game's graphics and sound resources, and other preparations.

In an embodiment, caching the game resource package from the server to the local device includes:

S11: Detect whether the somatosensory game is enabled on the local device for the first time.

Specifically, it may be judged by checking whether there are relevant files or identifiers of the somatosensory game on the device. If the detection result indicates that the somatosensory game is enabled on the local device for the first time, step S12 is performed.

S12: If so, cache the game resource package from the server to the local device.

Specifically, if the detection result indicates that the somatosensory game is enabled on the local device for the first time, then the game resource package is obtained and cached from the server to the local device. The local device establishes a connection with the server, sends a request to the server, and obtains a resource package including required game resources (such as graphics, sound effects, levels, etc.) from the server. The server responds to the request and transmits the game resource package to the local device, and then it is stored and cached on the local device.

S13: If not, compare a somatosensory game version of the local device with a somatosensory game version on the server, and when the somatosensory game version of the local device is inconsistent with the somatosensory game version of the server, cache the game resource package from the server to the local device.

Specifically, if the detection result indicates that somatosensory game is not enabled on the local device for the first time, a version comparison is required. In this case, an existing somatosensory game version on the local device is compared with a somatosensory game version on the server. If the somatosensory game version of the local device is inconsistent with the somatosensory game version of the server, it means that there is an updated or repaired game content, and the latest game resource package needs to be cached to the local device.

It can be understood that by comparing the versions and caching the game resource package when the versions are inconsistent, it is ensured that the somatosensory game on the local device is maintained to be synchronous with the somatosensory game on the server, so as to provide the latest game content and functions.

S20: After the somatosensory game is started, obtain somatosensory data from a smart watch.

Specifically, through the connection with the smart watch, the local device may obtain the somatosensory data from the watch. The somatosensory data may include sensor data such as acceleration, gyroscope, and heart rate of the watch, and is used to reflect the player's somatosensory actions.

S30: Generate a corresponding game instruction according to the somatosensory data.

Specifically, according to the somatosensory data obtained from the smart watch, an algorithm or model is used to process and analyze the data to generate corresponding game instructions. These game instructions may include the player's somatosensory actions, specific instructions for game operations, etc., and are used to control the progress of the game.

For example, game instructions may be generated through the following steps:

1. Preprocessing and filtering of data: preprocessing and filtering are performed on the obtained somatosensory data to improve the quality and accuracy of the data.

This may include operations such as removing noise, smoothing data, filtering, etc., to obtain more reliable and stable somatosensory data.

2. Analysis of somatosensory data: the preprocessed somatosensory data is analyzed to extract useful information and features. This involves detecting and identifying specific actions or gestures of the player, such as gestures, swings, raising hands, steps, etc.

3. Game instruction generation algorithm: based on the analyzed somatosensory data, specific algorithms or models are used to generate corresponding game instructions. These algorithms may be mapped, according to different somatosensory actions or postures, to specific operations in the game, such as moving, jumping, attacking, etc.

S40: Send the game instruction to the somatosensory game program on the local device in real time.

Specifically, the generated game instructions are sent to the running somatosensory game program in real time through the local device. In this way, game instructions may be transmitted to the game program in real time, so that the player's somatosensory actions can affect the progress of the game in real time.

Furthermore, according to the somatosensory data continuously provided by the smart watch, steps 30 to 40 are continuously performed repeatedly, so that new game instructions can be updated and generated in real time to reflect the player's latest somatosensory actions.

S50: Synchronize a game state of the somatosensory game to the server based on a preset synchronization mechanism.

Specifically, the game state refers to the overall situation and characteristics of the game at a specific point in time. It covers various elements in the game, including but not limited to game progress, character states, a game environment, game results, game rules and conditions. Among them, the game progress indicates a degree of completion or a level of a player in a game. It may be represented as the number of the level, the number of tasks completed, game props collected, etc.

The character state describes the current situation of a player or an virtual character. It may include the character's position, health point, energy, equipment and skills, etc.

The game environment refers to a game scene and a background setting. It may describe a map, weather, time, lighting effects and other elements in the game.

The game results reflect the player's achievements and performance in the game. It may be a score, the number of enemies defeated, the time to complete a level, rewards earned, etc.

The constraints of game rules and conditions refer to time-limited tasks, unlocking conditions, victory conditions, etc., in the game.

Specifically, when the somatosensory game is running on the local device, the current state of the somatosensory game may be fully synchronized to the server by using a preset synchronization mechanism. In this way, the server can record and manage the player's game progress, achievements and other information, and other players can view and participate in the same game environment.

It can be understood that the somatosensory game method of the present application can run the somatosensory game on the local device, and can also synchronize the game state of the somatosensory game to the server, so that the player's input and somatosensory actions are directly processed on the local device, and the game instructions are sent to the local game program in real time without waiting for the server's response, which can provide faster response speed and smoother game experience. Moreover, running the game on the local device reduces the dependence on a stable network connection. Even when the network is unstable or the connection is interrupted, the player can still continue the game, and the game state will be synchronized to the server after the network is restored. Besides, since most of the game running and processing work is done on the local device, the server only needs to handle game state synchronization and some core logic, which reduces the pressure on the server and improves the performance and response speed of the server. Additionally, by running the game locally, game data and player personal information can be better protected. Compared with storing all game data on the server, running the game locally can reduce the transmission and storage of the player's personal data, improving the player's privacy and data security.

Therefore, compared with the traditional somatosensory game method, the somatosensory game method of the present application can provide better performance, lower delay, offline support and higher data security, while reducing the dependence on the network and providing better player experience.

It is worth adding that since the game is developed based on HTML5, the somatosensory game has little system limitations on the local device, allowing players to play games on a variety of platforms.

In an embodiment, before synchronizing the game state of the somatosensory game to the server based on the preset synchronization mechanism, the method further includes:

determining the preset synchronization mechanism according to an online attribute of the somatosensory game.

Specifically, the somatosensory game may have different online attributes, such as single-player mode, multi-player mode, real-time mode, turn-based mode, and the like. These attributes determine the mode and mechanism of game state synchronization.

Further, the preset synchronization mechanism may be designed according to the requirement and the online attribute of the somatosensory game. It may include defining the time interval for synchronization, the data content to be synchronized, the mode of synchronization (such as push or pull), the priority of synchronization, etc. The preset synchronization mechanism can ensure the consistency of the game state between the local device and the server, and ensure that the player's game progress and achievements are correctly recorded and managed.

According to the online attribute of the somatosensory game, an appropriate synchronization mechanism may be selected. For example, when the online attribute of the somatosensory game is the real-time mode, the preset synchronization mechanism is as follows: at the beginning of each game frame, the latest game state is obtained from the server and compared with the game state of the local device; if the game state of the local device is inconsistent with the game state of the server, an adjustment will be made according to a preset conflict resolution strategy; at the end of each game frame, the game state of the local device is uploaded to the server, and the player information of the local device is broadcast to other players; besides, at each fixed time interval, other player information is obtained from the server and the game state of the local device is updated;

when the online attribute of the somatosensory game is the turn-based mode, the preset synchronization mechanism is as follows: at the beginning of each game round, the latest game state is obtained from the server and compared with the game state of the local device; if the game state of the local device is inconsistent with the game state of the server, an adjustment will be made according to the preset conflict resolution strategy; at the end of each game round, the game state of the local device is uploaded to the server, and the player information of the local device is broadcast to other players; besides, after the end of each game round, it waits for a notification from the server to determine the start of a next game round.

It can be understood that by determining the preset synchronization mechanism according to the online attribute of the somatosensory game, and synchronizing the game state to the server according to the mechanism, the present application implements to ensure accurate synchronization and management of the somatosensory game state based on the preset synchronization mechanism.

In an embodiment, if the online attribute of the somatosensory game is the single-player mode, synchronizing the game state of the somatosensory game to the server based on the preset synchronization mechanism includes:

S51: Build a game state cache library.

Specifically, the cache library may be a data structure or database on the local device, and is used to temporarily store game state data for subsequent synchronization to the server.

S52: Record game state information including a time stamp at set intervals, and cache the game state information to the game state cache library.

Specifically, the current game state information, including a time stamp to mark the recorded time, is recorded at regular time intervals, and the game state information is cached in the game state cache library. This may ensures that the game state is regularly recorded and stored for future synchronization to the server.

S53: When the capacity of the game instruction state cache library satisfies a specified capacity condition, package and upload all game state information in the game state cache library to the server;

Specifically, when the amount of game state information in the game state cache library reaches a preset capacity condition, all the game state information in the cache library is packaged and uploaded to the server.

For example, the capacity condition is 20 M. When the game state cache library occupies 20 M, the game state information in the cache library can be packaged and uploaded to the server. Here, the format of packaging may be zip, 7z, etc.

Through the above operations, the timely synchronization and backup of the game state can be ensured, thereby preventing data loss, and providing update and management for the game state on the server.

S54: When the somatosensory game ends, package and upload the remaining game state information in the game instruction cache library to the server.

Through the above operations, for the somatosensory game in the single-player mode, the game state can be cached and sent to the server uniformly. This setting has the following advantages:

1. Reduce the number of network transmissions: by caching the game state and sending it to the server when the condition is met, the number of network transmissions can be reduced. Compared with network transmission being performed every time the game state is updated, caching and sending the game state in batches can reduce network load and delay, and improve the efficiency and speed of data transmission.

2. Reduce the load of the server: by uniformly sending the game state, the load of the server can be reduced. The server does not need to process frequent individual game state update requests, but receives and processes the batch data of the entire game state at a specific point in time, reducing the consumption of server resources.

3. Simplify data processing and management: the game state is cached in the cache library of the local device, so that the game state can be processed and managed conveniently. The game state may be recorded, updated and cleaned according to certain rules and strategies to improve data availability and management efficiency.

4. Improve the consistency and integrity of the game state: by caching and sending the game state uniformly, the consistency and integrity of the game state can be ensured. The recording and sending of the game state is performed at a predetermined time point, which can ensure that the update and synchronization of the game state have a certain time interval, and reduce the problem of data loss or inconsistency caused by network transmission.

5. Offline support and data recovery: the game state is cached to the local device so that offline game and data recovery functions can be supported. Even if the network is interrupted or the device is disconnected, the game state can still be cached and uploaded to the server after the network is restored, ensuring the integrity of game data and the continuity of player experience.

In some embodiments, building a game state cache library includes:

S110: Obtain hardware device information of the local device.

Specifically, the hardware information of the local device includes processor model, memory capacity, storage space, etc. Among them, the frequency/processing speed of a processor may be determined according to the processor model.

By obtaining hardware device information, the performance and resource limitations of the local device can be understood, providing a reference basis for subsequently building the cache library.

S120: Obtain real-time memory operating status of the local device.

Specifically, the real-time memory operating status includes current memory usage, remaining memory capacity, memory access speed, etc. By monitoring the real-time memory operating status, the memory load of the current device can be understood, providing more accurate performance evaluation for subsequently building the cache library.

S130: Evaluate the current cache performance index of the local device according to the hardware device information and the real-time memory operating status.

Specifically, the cache performance index is an index for evaluating the cache performance of the local device. It reflects the efficiency and capability of the device in processing and managing the cache. The cache performance index is usually a quantitative value or score used to represent a cache performance level of the device. A higher cache performance index indicates that the device has higher cache performance and can manage and process cached data more effectively. This means that the device can quickly access and retrieve cached data, and can hold more data to provide better performance and responsive capability.

In some embodiments, evaluating the current cache performance index of the local device according to the hardware device information and the real-time memory operating status includes:

calculating a weighted mean of processor frequency, memory capacity, storage space, memory usage, memory remainder, and memory access speed as the current cache performance index.

Among them, the weighted mean is a method of calculating a mean, in which each value is assigned a weight, and the weight represents its relative importance. The weighted mean is calculated by multiplying each value by a corresponding weight, adding them, and dividing the sum by the sum of the weights. The calculation of the weighted mean may take into account the importance of different factors, and be adjusted according to actual needs.

As an example, the weighted mean of respective indicators of the device may be calculated in the following manner:

According to the various factors of hardware device information and real-time memory operating status, the indicators are assigned with different weights, and then their weighted mean is calculated. The higher the value, the better the cache performance.

For example, it is assumed to consider the following six factors: Processor Speed (PS), Memory Size (MS), Storage Space (SS), Memory Usage (MU), Memory Remainder (MR), Memory Profiler (MP), and the following weights may be assigned to them:

the weight of PS is 0.2;
the weight of MS is 0.15;
the weight of SS is 0.15;
the weight of MU is 0.1;
the weight of MR is 0.2; and
the weight of MP is 0.1.

Then, the cache performance index (CPI) can be calculated by the following formula:

$$CPI=0.2\times PS+0.15\times MS+0.15\times SS+0.1\times MU+0.2\times MR+0.1\times MP.$$

It can be understood that by evaluating the cache performance index of the local device, the performance of the device can be better understood, providing a reference basis for subsequently building and adjusting the game state cache library.

S140: Build and dynamically adjust the game state cache library according to the current cache performance index.

Specifically, according to the current cache performance index, the game state cache library is built and dynamically adjusted as needed. According to the level of the performance index, the size, data structure and management strategy of the cache library may be determined. A higher performance index may mean that the device has a larger cache capacity and higher performance, so a larger cache library may be built to provide more game state caching. Conversely, a lower performance index may require limiting the size of the cache library to avoid excessive consumption of device performance and memory resources.

In some embodiments, building and dynamically adjusting the game state cache library according to the current cache performance index includes:

S141: If the cache performance index is higher than a preset high threshold, then increase the capacity, recording frequency, and uploading frequency of the game state cache library.

Specifically, increasing the capacity of the game state cache library means that the capacity of the game state cache library may be increased according to the high value of the current cache performance index for more game state information to be cached.

Increasing the recording frequency means that the frequency of recording the game state may be increased to record the game state information more frequently to ensure the real-time and accuracy of the data.

Increasing the uploading frequency means that the frequency of uploading the game state may be increased, and the cached game state information may be uploaded to the server faster to ensure that the data is synchronized in time.

S142: If the cache performance index is lower than a preset low threshold, then reduce the capacity, recording frequency, and uploading frequency of the game state cache library.

Specifically, reducing the capacity of the game state cache library means that the capacity of the game state cache library may be reduced according to the low value of the current cache performance index, so as to reduce the consumption of device resources.

Reducing the recording frequency means that the frequency of recording the game state may be reduced to reduce the pressure on data recording and storage.

Reducing the uploading frequency means that the frequency of uploading the game state may be reduced to reduce the load on network bandwidth and server resources.

S143: If the cache performance index is between the preset high threshold and low threshold, then maintain the capacity, recording frequency, and uploading frequency of the game state cache library.

Specifically, maintaining the capacity of the game state cache library means that the capacity of the game state cache library may be maintained unchanged when the cache performance index is within an acceptable range, so as to reasonably utilize device resources.

Maintaining the recording frequency means that the frequency of recording the game state may be maintained unchanged to meet the requirements of data recording.

Maintaining the uploading frequency means that the frequency of uploading the game state may be maintained unchanged to maintain the effect of data synchronization and backup.

For example, the preset high threshold is 80, and the preset low threshold is 20. Specific steps for dynamically adjusting the game state cache library according to the current cache performance index are as follows:

A. if the cache performance index is higher than 80, increasing the capacity, recording frequency, and uploading frequency of the game state cache library by the percentage of the difference between the cache performance index and 80 divided by 10;

B. if the cache performance index is lower than 20, reducing the capacity, recording frequency, and uploading frequency of the game state cache library by the percentage of the difference between 20 and the cache performance index divided by 10; and C. if the cache performance index is between 20 and 80, maintaining the capacity, recording frequency, and uploading frequency of the game state cache library unchanged.

It can be understood that by dynamically adjusting the capacity, recording frequency, and uploading frequency of the game state cache library according to the different conditions of the current cache performance index, the cache management of the game state can be optimized according to the performance and resource constraints of the device, thereby improving the game performance and player experience.

In some embodiments, if the online attribute of the somatosensory game is the online mode, synchronizing the game state of the somatosensory game to the server based on the preset synchronization mechanism includes:

S210: At the beginning of each game frame, obtain the latest game state from the server, and compare the latest game state with the game state of the local device.

S220: If the game state of the local device is inconsistent with the game state of the server, make an adjustment according to a preset conflict resolution strategy.

The conflict resolution strategy may include choosing to take the game state of the server or the game state of the local device as a reference, or resolving a conflict in other appropriate ways, so as to ensure the consistency of the game state.

Specifically, the conflict resolution strategy includes:

S221. determining the latest game state according to the time stamp, and taking the latest game state as the reference;

S222. at the end of each game frame, uploading the game state of the local device to the server, and broadcasting the player information of the local device to other players, the player information including player ID, position, score, etc.; and S223. obtaining other player information from the server every 0.5 seconds, and updating the game state of the local device, the game state including a game scene, an object, an event, etc.

S230: At the end of each game frame, upload the game state of the local device to the server, and broadcast player information of the local device to other players.

Specifically, at the end of each game frame, the game state information of the local device is uploaded to the server, so as to ensure that other players can obtain the latest game state. At the same time, the player information of the local device is broadcast to other players to support the interaction and collaboration of online games.

S240: Within each fixed time interval, obtain other player information from the server, and update the game state of the local device.

Specifically, within the fixed time interval, the game information of other players, such as position, action, etc., is obtained from the server, and the information is updated to the game state of the local device, so as to realize real-time interaction and synchronization between players.

With the above solution, when facing an online somatosensory game, the consistency and real-time performance of the local game state and the server-side game state can be ensured. The traditional game method of uploading game instructions to the server has the following advantages:

1. Reduce the amount of network transmission: the traditional method of uploading game instructions in real time needs to send each operation instruction to the server, resulting in a large amount of network transmission. The real-time synchronization game state solution only needs to synchronize the game state, which greatly reduces the amount of data of network transmission. This reduces the burden on the network, reduces latency, and improves the responsive speed and smoothness of the game.

2. Enhance anti-cheating ability: the real-time synchronization game state solution can improve the anti-cheating ability of the game. Since the game state is synchronized and managed by the server, players cannot gain an unfair advantage by modifying the local game state. This helps maintain the fairness and competitiveness of the game.

3. Support disconnection recovery and data backup: the real-time synchronization game state solution can support disconnection recovery and data backup functions. Even in the case of network interruption or device disconnection, the player's game state can still be retained and restored, ensuring the integrity and stability of game data.

In addition, an embodiment of the present invention also proposes a computer-readable storage medium, which may be any one of or any combination of a hard disk, a multimedia card, an SD card, a flash memory card, an SMC, a read-only memory (ROM), an erasable programmable read-only memory (EPROM), a portable compact disk read-only memory (CD-ROM), a USB memory, etc. The computer-readable storage medium comprises the smart watch-based HTML5 somatosensory game program. Specific implementations of the computer-readable storage medium of the present invention are substantially the same as those of the smart watch-based HTML5 somatosensory game and the server 1 described above, and they will not be repeated here.

It should be understood by those skilled in the art that the embodiments of the present invention may be provided as methods, systems, or computer program products. Therefore, the present invention can take the form of an entirely hardware embodiment, an entirely software embodiment, or an embodiment combining software and hardware aspects. Furthermore, the present invention may take the form of a computer program product embodied on one or more computer-usable storage media (including but not limited to disk storage, CD-ROM, optical storage, etc.) having computer-usable program code embodied therein.

The present invention is described with reference to flowcharts and/or block diagrams of methods, devices (systems), and computer program products according to embodiments of the invention. It should be understood that each procedure and/or block in the flowcharts and/or block diagrams, and combinations of procedures and/or blocks in the flowcharts and/or block diagrams can be implemented by computer program instructions. These computer program instructions may be supplied to a general purpose computer, a special purpose computer, an embedded processor, or a processor of other programmable data processing equipment to produce a machine, so that the instructions executed by the computer or the processor of other programmable data processing equipment produce means for implementing the function(s) specified in one or more steps of the flowcharts and/or one or more blocks of the block diagrams.

These computer program instructions may also be stored in a computer-readable memory capable of directing a computer or other programmable data processing equipment to operate in a specific manner, so that the instructions stored in the computer-readable memory produce an article of manufacture comprising instruction means. The instruction means implement the function(s) specified in one or more procedures of the flowcharts and/or one or more blocks of the block diagrams.

These computer program instructions may also be loaded onto a computer or other programmable data processing equipment, causing a series of operation steps to be performed on the computer or other programmable equipment to produce a computer-implemented process, so that the instructions executed on the computer or other programmable equipment provide steps for implementing the function(s) specified in one or more procedures of the flowcharts and/or one or more blocks of the block diagrams.

While preferred embodiments of the present invention have been described, additional changes and modifications to these embodiments can be made by those skilled in the art once they are aware of basic inventive concepts. Therefore, it is intended that the appended claims be construed to cover the preferred embodiment as well as all changes and modifications which fall within the scope of the present invention.

Obviously, those skilled in the art can make various changes and modifications to the present invention without departing from the spirit and scope of the present invention. Thus, if these modifications and variations of the present invention fall within the scope of the claims of the present invention and equivalent technologies thereof, the present invention is also intended to comprise these modifications and variations.

What is claimed is:

1. A smart watch-based somatosensory game method, comprising:

when a somatosensory game program is started, caching a game resource package from a server to a local device;

after a somatosensory game is started, obtaining somatosensory data from a smart watch;

generating, using the local device, a corresponding game instruction according to the somatosensory data;

sending the game instruction to the somatosensory game program on the local device in real time; and synchronizing a game state of the somatosensory game to the server based on a preset synchronization mechanism.

2. The smart watch-based somatosensory game method according to claim 1, wherein before synchronizing the game state of the somatosensory game to the server based on the preset synchronization mechanism, the method further comprises:

determining the preset synchronization mechanism according to an online attribute of the somatosensory game.

3. The smart watch-based somatosensory game method according to claim 2, wherein if the online attribute of the somatosensory game is a single-player mode, synchronizing the game state of the somatosensory game to the server based on the preset synchronization mechanism comprises:

building a game state cache library;

recording game state information comprising a time stamp at set intervals, and caching the game state information to the game state cache library;

when a capacity of the game instruction state cache library satisfies a specified capacity condition, packaging and uploading all game state information in the game state cache library to the server; and when the somatosensory game ends, packaging and uploading the remaining game state information in the game instruction cache library to the server.

4. The smart watch-based somatosensory game method according to claim 3, wherein building the game state cache library comprises:

obtaining hardware information of the local device;

obtaining real-time memory operating status of the local device;

evaluating a current cache performance index of the local device according to the hardware information and the real-time memory operating status; and building and dynamically adjusting the game state cache library according to the current cache performance index.

5. The smart watch-based somatosensory game method according to claim 4, wherein the hardware information comprises processor model, memory capacity, and storage space;

the real-time memory operating status comprises current memory usage, remaining memory capacity, and memory access speed; and evaluating the current cache performance index of the local device according to the hardware device information and the real-time memory operating status comprises:

calculating a weighted mean of processor frequency, memory capacity, storage space, memory usage, memory remainder, and memory access speed as the current cache performance index.

6. The smart watch-based somatosensory game method according to claim 4, wherein building and dynamically adjusting the game state cache library according to the current cache performance index comprises:

if the cache performance index is higher than a preset high threshold, then increasing the capacity, recording frequency, and uploading frequency of the game state cache library;

if the cache performance index is lower than a preset low threshold, then reducing the capacity, recording frequency, and uploading frequency of the game state cache library; and if the cache performance index is between the preset high threshold and low threshold, then maintaining the capacity, recording frequency, and uploading frequency of the game state cache library.

7. The smart watch-based somatosensory game method according to claim 1, wherein if the online attribute of the somatosensory game is an online mode, synchronizing the game state of the somatosensory game to the server based on the preset synchronization mechanism comprises:

at the beginning of each game frame, obtaining the latest game state from the server, and comparing the latest game state with the game state of the local device;

if the game state of the local device is inconsistent with the game state of the server, making an adjustment according to a preset conflict resolution strategy;

at the end of each game frame, uploading the game state of the local device to the server, and broadcasting player information of the local device to other players; and within each fixed time interval, obtaining other player information from the server, and updating the game state of the local device.

8. The smart watch-based somatosensory game method according to claim 1, wherein caching the game resource package from the server to the local device comprises:

detecting whether the somatosensory game is enabled on the local device for the first time;

if so, caching the game resource package from the server to the local device; and if not, comparing a somatosensory game version of the local device with a somatosensory game version on the server, and when the somatosensory game version of the local device is inconsistent with the somatosensory game version of the server, caching the game resource package from the server to the local device.

9. A smart watch-based somatosensory game device, comprising a memory, a processor and a smart watch-based somatosensory game program stored on the memory and executable on the processor, wherein when the processor executes the smart watch-based somatosensory game program, the smart watch-based somatosensory game method according to claim 1 is implemented.

10. A non-transitory computer-readable storage medium, having a smart watch-based somatosensory game program stored thereon, wherein when the smart watch-based somatosensory game program is executed by a processor, the smart watch-based somatosensory game method according to claim 1 is implemented.

\* \* \* \* \*